United States Patent [19]
Riley et al.

[11] Patent Number: 4,888,365
[45] Date of Patent: Dec. 19, 1989

[54] ISOCYANATE TERMINATED QUASI-PREPOLYMERS USEFUL FOR PREPARING POLYURETHANE/POLYISOCYANURATE FOAMS HAVING LOW THERMAL CONDUCTIVITY

[75] Inventors: Robert E. Riley, Flat Rock; Thirumurti Naravan, Grosse Ile, both of Mich.

[73] Assignee: BASF Corporation, Parsippany, N.J.

[21] Appl. No.: 245,089

[22] Filed: Sep. 16, 1988

Related U.S. Application Data

[63] Continuation of Ser. No. 13,653, Feb. 12, 1987, Pat. No. 4,791,148.

[51] Int. Cl.$^4$ ............................................. C08G 18/30
[52] U.S. Cl. ..................................... 521/157; 521/159; 521/172; 521/174; 521/177; 528/59; 528/60; 528/66; 528/76; 528/79; 528/81; 528/83; 528/84; 528/85
[58] Field of Search ............... 521/157, 159, 172, 174, 521/177; 528/59, 60, 66, 76, 79, 81, 83, 84, 85

[56] References Cited

U.S. PATENT DOCUMENTS

| | | | |
|---|---|---|---|
| 3,647,759 | 3/1972 | Walker | 528/296 |
| 3,892,796 | 7/1975 | Leibfried | 560/118 |
| 4,048,104 | 9/1977 | Svoboda et al. | 521/159 |
| 4,223,068 | 9/1980 | Carlstrom et al. | 428/310 |
| 4,237,238 | 12/1980 | DeGuiseppi et al. | 521/131 |
| 4,435,537 | 3/1984 | Horn et al. | 524/391 |
| 4,506,090 | 3/1985 | Brennan et al. | 560/91 |
| 4,636,530 | 1/1987 | Narayan | 521/159 |
| 4,644,027 | 2/1987 | Magnus et al. | 524/375 |
| 4,758,605 | 7/1988 | Williams | 521/129 |
| 4,791,148 | 12/1988 | Riley et al. | 521/159 |

Primary Examiner—John Kight
Assistant Examiner—Samuel A. Acquah
Attorney, Agent, or Firm—Cary W. Brooks

[57] ABSTRACT

Polyurethane/polyisocyanurate rigid foams having low thermal conductivity are prepared from isocyanate-terminated quasi-prepolymers prepared from polyester polyols derived from phthalic anhydride or from the transesterification of polyethylene terephthalate scrap.

5 Claims, No Drawings

ISOCYANATE TERMINATED QUASI-PREPOLYMERS USEFUL FOR PREPARING POLYURETHANE/POLYISOCYANURATE FOAMS HAVING LOW THERMAL CONDUCTIVITY

This is a continuation of application Ser. No. 013,653 filed Feb. 12, 1987, now U.S. Pat. No. 4,791,148.

BACKGROUND OF THE INVENTION

1. Field of the Invention

The present invention relates to isocyanate-terminated quasi-prepolymers and to polyurethane/polyisocyanurate foams prepared therefrom. The quasi-prepolymers of the subject invention are prepared by reacting a stoichiometric excess of one or more organic isocyanates with a polyester polyol derived from phthalic anhydride or from the transesterification of polyethylene terephthalate scrap. The foams prepared from these quasi-prepolymers have low thermal conductivity. 2.

Description of the Related Art

Rigid foams derived from polyisocyanate addition polymerization continue to be an important and expanding segment of the polyurethane industry. These rigid foams may be prepared by numerous methods resulting in foams having a wide variety of physical and chemical properties. One of the most important areas of application for rigid foam produced by polyisocyanate addition polymerization is in the area of foamed-in-place insulation. Such insulation is commonly found in refrigerator and freezer cabinets, chest-type coolers, refrigerated tractor-pulled trailers, and building panels and insulated doors. Another important area of application for rigid foams is laminate board for construction applications. Increasing amounts are being utilized in buses, trains, and, particularly, in aircraft construction where the high insulating capacity is combined with the suitable physical properties to produce a variety of structural components.

Because of the types of applications which rigid foams lend themselves to, the thermal conductivity of these foams is of critical importance. The insulating properties, or thermal conductivity, of rigid foams are expressed by the K-factor and aged K-factor. The K-factor is a measurement of the insulating properties (thermoconductivity) and aged K-factor indicates insulating properties over time. The foams prepared from the quasi-prepolymers of the present invention exhibit low initial thermal conductivity values and maintain low thermal conductivity values after prolonged periods of use. Lower thermal conductivity values, of course, mean better insulating ability.

One class of aromatic polyester polyols which is commercially available comprises esters produced by esterifying phthalic acid or phthalic acid anhydride with an aliphatic polyhydric alcohol, for example, a diethylene glycol phthalate.

Another class of aromatic polyester polyols which is commercially available comprises esters produced by reacting polyethylene terephthalate (PET) with alkylene polyols. More particularly, scrap or waste PET can be digested (glycolized) with a diol or triol as disclosed in U.S. Pat. No. 4,048,104; treated with caustic monohydric alcohol, U.S. Pat. No. 3,728,287. treated with monohydric alcohol and ester exchange catalyst, U.S. Pat. No. 3,488,298; heated with glycols and vinyl acetate, U.S. Pat. No. 3,857,799; heated with bis ester solvents, U.S. Pat. No. 3,884,850; or dissolved in ethylene glycol and/or terephthalic acid and/or dimethyl terephthalate, U.S. Pat. Nos. 3,907,868; 3,701,741; 3,703,488; 3,776,945; and 3,257,335. The products of these digestion processes may be reintroduced into the process from which they originate.

Generally, it is known that polyurethane foam can be prepared by using PET scrap derived polyol as a minor percentage of the polyol component. Such foams are said to exhibit improved fire retardant properties, U.S. Pat. No. 4,223,068.

It is also generally known that PET scrap derived polyols can be used as polyol extenders in preparing polyurethane foams as disclosed in U.S. Pat. No. 4,506,090.

U.S. Pat. No. 4,636,530, entitled "Isocyanate Terminated Quasi-Prepolymers Useful for Preparing Urethane-Group-Containing Polyisocyanate Foams Having Low Friability" discloses rigid polyisocyanurate foams prepared from quasi-prepolymers prepared by reacting a stoichiometric excess of one or more organic isocyanates with a polyester polyol derived from the transesterification of dimethyl terephthalate process residue.

In U.S. Pat. No. 4,608,432, it is generally disclosed that polyester polyols prepared from the reaction product of polyethylene terephthalate scrap; at least one low molecular weight aliphatic diol; and at least one compatibilizer compound, are useful in preparing polyurethane and polyurethane/polyisocyanurate foams.

SUMMARY OF THE INVENTION

It has now been surprisingly discovered that isocyanate terminated quasi-prepolymers may be prepared from polyester polyols derived from phthalic anhydride or polyethylene terephthalate scrap. The quasi-prepolymers are storage stable, and can be polymerized in the presence of polyols and catalysts to form polyurethane and/or polyisocyanurate foams having improved insulating properties. The foams exhibit low initial thermal conductivity values and maintain low thermal conductivity values after prolonged periods of use.

DESCRIPTION OF THE PREFERRED EMBODIMENTS

The isocyanate-terminated quasi-prepolymers of the subject invention are prepared by reacting together one or more organic isocyanates with a polyester polyol derived from phthalic anhydride or from polyethylene terephthalate scrap through transesterification with an aliphatic diol, polyol, or alkanolamine.

By the term organic isocyanate is meant organic isocyanates having a functionality of two or higher. For example, organic diisocyanates, polyisocyanates, or mixtures thereof may be used successfully. The organic isocyanates may be aliphatic, cycloaliphatic, alicyclic, aromatic or aromatic aliphatic isocyanates. The various isocyanates suitable for the preparation of the quasi-prepolymers of the invention are well known to those skilled in the art.

Among the many isocyanates suitable for the practice of the subject invention are, for example, aliphatic isocyanates such as tetramethylene, hexamethylene, octamethylene and decamethylene diisocyanates, and their alkyl substituted homologs; cycloaliphatic isocyanates such as 1,2-, 1,3- and 1,4-cyclohexane diisocyanates, 2,4- and 2,6-methylcyclohexane diisocyanates, 4,4'- and 2,4'- dicyclohexyldiisocyanates, 4,4'- and 2,4'-dicyclohexllmethane diisocyanates, 1,3,5-cyclohexane triisocyanate, and saturated (hydrogenated) polymethylenepolyphenylenepolyisocyanates; alicyclic isocyanates such as isocyanatomethylcyclohexane isocyanates, isocyanatoethylcyclohexane isocyanates, bis(isocyanatomethyl)cyclohexane diisocyanates, 4,4'- and 2,4'-bis(isocyanatomethyl)dicyclohexane, and isophorone diisocyanate; aromatic isocyanates such as 1,2-, 1,3-, and 1,4-phenylene diisocyanates, 2,4- and 2,6-toluene diisocyanate, 2,4'-, 4,4'-, and 2,2'-biphenyl diisocyanates, 2,2'-, 2,4'- and 4,4'-diphenylmethane diisocyanates, and polymethylenepolyphenylenepolyisocyanates (polymeric MDI); and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group-and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4'-, and 2,2'-diphenylmethane diisocyanate as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however are the aromatic diisocyanates and polyisocyanates. Particularly preferred are 2,4-, and 2,6-toluene diisocyanate and mixtures thereof (TDI), 2,4'-, 2,2'- and 4,4'- diphenylmethane diisocyanate (MDI), polymethylenepolyphenylenepolyisocyanates (polymeric MDI), and mixtures of the above preferred isocyanates.

Most particularly preferred are the polymeric MDIs.

Examples of the polyethylene terephthalate derived polyester polyols are those derived from the waste or scrap involved in polyethylene terephthalate manufacture by transesterification with aliphatic polyols. Generally, PET scrap is digested (glycolized) with a diol or triol; treated with caustic monohydric alcohol; treated with monohydric alcohol and an ester exchange catalyst; heated with glycols and vinyl acetate; heated with bis ester solvents; or dissolved in ethylene glycol and/or terephthalic acid and/or dimethyl terephthalate to afford polyester polyols. Suitable PET derived polyester polyols, for example, are disclosed in U.S. Pat. Nos. 4,084,104 and 4,608,432. The polyester polyols produced by the above processes are low in cost, predominately hydroxyl functional, having a wide variety of physical properties. Such PET scrap derived polyester polyols are commercially available under the designations CHARDOL 570, 571 and 572 from Chardonol Corp, Houston, Tex.; and FREOL 30-2150 from Freeman Chemical. As the viscosity of the product quasi-prepolymer is related, at least as a first approximation, to the viscosity of the PET-derived polyester, those polyesters with lower viscosity are preferred.

The PET scrap derived polyester polyols of the subject invention are all highly polar polyester polyols having a high weight percentage of aromatic character. Preferably, the hydroxyl number of suitable PET waste derived polyester polyols is between 100 and 600, more preferably between 200 and 500, and particularly between 230 and 450.

Examples of the phthalic anhydride derived polyester polyols are those polyester polyols derived from esterification of phthalic anhydride with an aliphatic polyhydric alcohol. Preferably, the phthalic anhydride derived polyester polyol is the reaction product of phthalic anhydride and diethylene glycol. Such polyols are commercially available under the designations PLURACOL ® polyol 9118 from BASF Corporation, Parsippany, N.J.; STEPANPOL PS-2502, PS-2522, PS-2852, and PS-2552 from Stepan Company, Northfield, Ill. As the viscosity of the product quasi-prepolymer is related, at least as a first approximation, to the viscosity of the phthalic anhydride derived polyester, those polyesters with lower viscosity are preferred.

The phthalic anhydride derived polyester polyols of the subject invention are highly polar polyester polyols having a high weight percentage of aromatic character. Preferably, the hydroxyl number of suitable phthalic anhydride derived polyester polyols is between 100 and 600, more preferably between 200 and 500, and particularly between 230 and 450. Those isocyanate-terminated quasi-prepolymers of the present invention prepared from phthalic anhydride derived polyester polyols, and the foams prepared therefrom, are preferred.

Catalysis is generally not required to form the quasi-prepolymers, and it is undesirable to include non-removable catalysts whose residual catalytic effect would cause further polymerization leading to undesirable increases in viscosity during storage. However catalysts which do not promote the reaction of isocyanate groups with each other may be used, especially when the quasi-prepolymer is to be foamed within a short time.

Catalysts suitable for the preparation of the isocyanate-terminated prepolymers are, for example, the various alkyl tin carboxylates and tin carboxylates. Preferably used when catalysis is desired for example, are tin-(II) octoate, and dibutyl tin dilaurate. When catalysts are used, they may be present in amounts at from 0.005 to 2 percent by weight, preferably from 0.01 to 0.1 percent by weight. As indicated previously, preferably no catalyst is utilized.

To prepare the foams of the subject invention, the quasi-prepolymers must be mixed with suitable catalysts, polyols, blowing agents, surface active agents (foam stabilizers), and optionally, other additives and auxiliaries known to those skilled in the art.

Suitable blowing agents are non-reactive, nonpolar blowing agents, particularly the fluorochlorocarbon blowing agents. Particularly well suited for the practice of the subject invention are the halocarbon blowing agents generally used in the urethane foam art. These halocarbon blowing agents are available, for example under the trademarks Freon ® and Genetron ®. A table of suitable blowing agents may be found in U.S. Pat. 3,763,111.

The addition of an isocyanurate promoting catalyst is necessary for the preparation of polyisocyanurate foams based on the quasi-prepolymers of the subject invention. These trimerization catalysts are well known to those skilled in the art. A great many catalysts are disclosed in the Journal of Cellular Plastics, Dec. 1975, at page 329; and in U.S. Pat. Nos. 3,745,133, 3,896,052, 3,899,443, 3,903,018, 3,954,684, and 4,101,465.

Typical trimerization catalysts are glycine salts and strong organic bases such as the alkali metal carboxylates and tertiary amines. The amount of catalyst required will vary to some degree with the particular quasi-prepolymer and other foam system ingredients as well as the particular application. However catalyst amounts generally range from 0.1 parts to 20 parts by weight relative to the overall weight of product, preferably from 0.2 parts to 5 parts, and more particularly, 0.4 parts to 1 part.

Urethane catalysts which are employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are disclosed in U.S. Pat. No. 2,846,408. Tertiary amines such as triethylenediamine, triethylamine, diethylcyclohexylamine, dimethylethanolamine, methylmorpholine, trimethylpiperazine, N-ethylmorpholine and diethylethanolamine may also be employed as well as mixtures of any of the above. The preferred urethane-promoting catalysts are dibutyltin diacetate and dibutyltin dilaurate. Generally, the amount of the urethane-promoting catalyst employed will be from 0.01% to 10% by weight based on the weight of organic polyisocyanate.

A foam stabilizing agent is also generally required in producing the polyisocyanurate foams of the subject invention. Conventional foam stabilizing agents are useful, particularly the various polyether polysiloxanes. Suitable polyether polysiloxane stabilizers are described in U.S. Pat. 2,764,565. Particularly preferred are the polyoxyalkylene polyether polysiloxanes marketed by the Dow Corning Corporation as DC-193.

Any organic compound having at least two active hydrogen atoms as determined by the well-known Zerewitinoff test, as described by Kohler in *Journal of the American Chemical Society*, 49, 3181 (1927) may be employed in the subject invention. These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene polyether polyols, hydroxy-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glycoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene polyether glycols, polypropylene polyether glycols, and polybutylene polyethy glycols. The polyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two -SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylenepolyalkylene polyamine (crude methylene dianiline), p-aminoaniline, 1,5-diaminonaphthalene, and 2,4-diaminotoluene; aliphatic polyamines such as ethylenediamine, 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps at 10% polymer concentration.

A more comprehensive discussion of the graft polyols and their method of preparation can be found in U.S. Pat. Nos. 3,383,351; 3,304,273; 3,652,639; and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed is not a critical aspect of the present invention. Any compound containing at least two reactive hydrogen atoms may be so used. Particularly preferred compounds are those having an equivalent weight between 100 and 1500. Generally, the amount of polyol employed will be from 10% to 80% by weight, preferably from 15% to 70% by weight, based on the weight of the organic polyisocyanate. Thus, the foams of the invention may be prepared employing an NCO/OH ratio of from 3:1 to 100:1, preferably from 4:1 to 25:1.

Although any of the polyols described above may be used in the present invention, generally the preferred polyol will be selected from the group polyether polyols, hydroxyl-functional polyester polyols, and hydroxyl-functional polyesterether polyols.

The preparation at the quasi-prepolymers of the subject invention is accomplished simply by reacting the isocyanate and phthalic anhydride or PET scrap derived polyester polyol in a suitable reaction vessel, generally in an inert (nitrogen) atmosphere. The isocyanate is preferably heated to approximately 50° to 70° C. before addition of the phthalic anhydride or PET scrap derived polyester, which is added gradually with stirring over a period of time generally between 15 minutes and several hours. A modest exotherm is allowed to develop and the temperature is increased to approximately 80° C. and held there until the desired NCO content is reached, after which the product is discharged.

The quantity of phthalic anhydride or PET scrap derived polyester which is reacted with the isocyanate may vary, but generally is not less than 2 percent and not more than 30 percent relative to the weight of the final quasi-prepolymer, and preferably 20 percent or less. The stoichiometry must be such that sufficient equivalents of isocyanate are present to insure that the finished quasi-prepolymer will be isocyanate-terminated, as is well known to those skilled in the art. Examples of analogous formulations and their stoichiometrics may be found in *Polyurethanes: Chemistry and Technology*, volumes I and II, by Saunders and Frisch, published by Wiley-Interscience.

The foams of the present invention are prepared by mixing together the quasi-prepolymer and a polyol in an equivalent ratio of isocyanate groups to hydroxyl groups in excess of 1:1 in the presence of a catalyst, a blowing agent and a foam stabilizer at an initiating temperature which, depending on the catalyst, will range from about 0° C. to 50° C. When using a mixing chamber, or mixing head, the basic components may be fed in individually. It has been found to be particularly advantageous to use a two-stream mix. One feed stream contains the quasi-prepolymer, while the second stream comprises a resin prepolymer blend.

Resin prepolymer blends can be easily and conveniently prepared by procedures known to those skilled in the art. Generally, such resin prepolymer blends are prepared by admixing the polyol; a urethane-forming, an isocyanurate forming, and/or mixed polyurethane/polyisocyanurate forming catalyst or catalyst system; a blowing agent; and a foam stabilizer. It may be desirable to further include a compatibilizer of a type known to those skilled in the art, and other auxiliaries and additives.

The following examples will serve to illustrate the process of the present invention. All parts are by weight unless otherwise indicated. In the examples, the K-factors of the foams were determined in accordance with ASTM C-518-177-45. In the examples which follow, the following abbreviations are employed:

| | |
|---|---|
| CHARDOL 570 | is a polyethylene terephthalate ester derived from PET scrap with a hydroxyl number of about 350 and a viscosity at 25° C. of about 10,000 cps and is commercially available from Chardonol Corporation. |
| LUPRANATE M20S | is polymethylene polyphenylene polyisocyanate having an NCO content of about 31.8 and a viscosity of 180 to 250 cps at 25° C. |
| Polyol A | is the propylene oxide adduct of pentaerythritol and propylene glycol with a functionality of about 3.5 and having a hydroxyl number of about 560. |
| Polyol B | is the propylene oxide adduct of propylene glycol with a hydroxyl number of about 260. |
| LUPRANATE M70 | is polymethylene polyphenylene polyisocyanate with an NCO content of about 31.3 and has a viscosity of 650 to 750 cps at 25° C. |
| No. 78 ISOCYANATE | is a lower functionality polymethylene polyphenylene polyisocyanate having an NCO content of about 32.0 and having a |

-continued

| | |
|---|---|
| Polyol C | viscosity of 60 to 80 cps at 25° C. is ethylene and propylene oxide adduct of toluenediamine containing 30 weight percent ethylene oxide with a hydroxyl number of about 390. |
| CHARDOL 625A | is polyethylene terephthalate scrap ester with a hydroxyl number of about 280 and is commercially available from Chardonol Corporation. |
| DC-193 | is polyalkylsiloxane-polyalkylene copolymer, a foam stabilizer. |
| POLYCAT 8 | is N,N—dimethylcyclohexylamine commercially available from Air Products. |
| T-12 | is dibutyltin dilaurate commercially available from M&T Chemicals. |
| F-11A | is trichlorofluoromethane. |
| Polyol D | is the ethylene oxide adduct of toluenediamine with a functionality of about 4, a hydroxyl number of about 450. |
| Polyol E | is diethylene glycol ester of phthalic anhydride with a hydroxyl number of about 250. |
| POLYCAT 5 | is N,N,N,N,N—pentamethyldiethylenetriamine commercially available from Air Products. |
| K Hex-Cem 977 | is potassium octoate in diethylene glycol (14 percent active potassium) commercially available from Mooney Chemical. |
| DMP-30 | is 2,4,6-Tri(dimethylaminomethyl) phenol. |
| PS-3152 | is an aromatic polyester polyol having hydroxyl number of about 300 to 330 and a viscosity of about 2000 to 3000 cps at 25° C. and is commercially available from Stepan Company. |

EXAMPLE 1

Preparation of Quasi-Prepolymers

The respective polyisocyanate was charged to a dry reaction vessel equipped with an agitator and nitrogen inlet. The reaction contents were agitated under a nitrogen blanket throughout the preparation. The polyisocyanate in the reactor was heated to 72 ± 3° C. The polyol was added at a constant rate over a period of 15 minutes to 60 minutes maintaining the temperature at 72 ± 3° C. After the polyol addition has been completed, the reaction was continued for one more hour at 72 ± 3° C. The properties of the isocyanate terminated quasi-prepolymer resins prepared in this manner are summarized in the table below.

TABLE I

Properties of Quasi-Prepolymers

| Sample Weight % | A | B | C | D | E | F | J | K | L |
|---|---|---|---|---|---|---|---|---|---|
| LUPRANATE ® M20S | 95.0 | 98.3 | 95.7 | 96.6 | 97.1 | 87.0 | — | 95 | — |
| Polyol E | 5.0 | — | — | — | — | 13.0 | — | — | 5.0 |
| CHARDOL 570 | — | — | 4.3 | 3.4 | — | — | — | — | — |
| PS-3152 | — | — | — | — | — | — | — | 5 | — |
| Polyol A | — | 1.7 | — | — | — | — | 1.88 | — | — |
| Polyol B | — | — | — | — | 2.9 | — | — | — | — |
| No. 78 ISOCYANATE | — | — | — | — | — | — | 98.12 | — | 95.0 |
| NCO, % | 28.7 | 30.0 | 29.0 | 29.3 | 29.9 | 24.6 | 29.8 | 28.8 | 28.9 |
| Viscosity, cps at 25° C. | 761 | 476 | 1087 | 770 | 439 | 13,840 | 162 | 936 | 225 |

As shown in Table I above, quasi-prepolymer Samples A, C, D, F, K and L are within the scope of the present invention. Quasi-prepolymer Samples B, E and J are prepare using polyether polyols and were prepared for comparison purposes.

The following resins were also prepared by mixing under high speed the reactants stated in the amount stated in parts by weight.

TABLE II

Preparation of Resins

| | Parts by Weight |
|---|---|
| Sample G | |
| Polyol C | 100.0 |
| DC-193 | 2.0 |
| POLYCAT 8 | 1.5 |
| T-12 | 0.05 |
| H$_2$O | 1.0 |
| Fluorocarbon 11A | 30.0 |
| Sample H | |
| Polyol C | 60.0 |
| Polyol D | 15.0 |
| CHARDOL 570 | 25.0 |
| DC-193 | 1.0 |
| POLYCAT 5 | 1.2 |
| H$_2$O | 1.0 |
| Fluorocarbon 11A | 35.0 |
| Sample H$_{mod}$ | |
| Polyol C | 60.0 |
| Polyol D | 15.0 |
| CHARDOL 570 | 25.0 |
| POLYCAT 5 | 1.0 |
| H$_2$O | 1.5 |
| F-11A | 47.0 |
| DC-193 | 1.0 |
| Sample I | |
| CHARDOL 625A | 100.0 |
| DC-193 | 2.0 |
| K Hex-Cem 977 | 2.4 |
| DMP-30 | 0.6 |
| Fluorocarbon 11A | 44.0 |

As shown above in Table II, resin blends were prepared using a polyether polyol, a polyester polyol and a polyester ether blend polyol.

A series of foams was prepared by conventional hand-mix techniques using the quasi-prepolymers and resins described above. The reactants employed and amounts thereof used are presented below in Tables III through VI. All foam samples were poured as vertical free rise panels measuring 10" × 10" × 4" with 4" being the panel width. After curing for about 24 hours, unless otherwise stated, two test samples measuring 8" × 8" × 1" were cut from each foam. Samples cut from the same foam are given the same numerical designation, for example, 1A and 1B, 2A and 2B.

TABLE III

Preparation of Foams

| Example Component | 1 | 2 | 3 | 4 | 5 | 6 | 7 | 8 |
|---|---|---|---|---|---|---|---|---|
| Sample G | 144.3 | 143.3 | 140.0 | 140.1 | 137.6 | 127.3* | 137.4 | 138.5 |

TABLE III-continued

Preparation of Foams

| Example Component | 1 | 2 | 3 | 4 | 5 | 6 | 7 | 8 |
|---|---|---|---|---|---|---|---|---|
| Sample H | | | | | | | | |
| LUPRANATE ® M20S | 125.7 | | | | | | | |
| LUPRANATE ® M70 | | 126.7 | | | | | | |
| Sample J | | | 130.0 | | | | | |
| Sample E | | | | 129.9 | | | | |
| Sample A | | | | | 132.4 | | | |
| Sample F | | | | | | 142.7 | | |
| Sample C | | | | | | | 132.6 | |
| Sample D | | | | | | | | 131.5 |
| Index | 110 | 110 | 110 | 110 | 110 | 110 | 110 | 110 |

*5.4 parts by weight fluorocarbon 11A added to the resin to adjust density.

As can be seen above in Table III, Examples 1 and 2 are outside the scope of the present invention as the foams were not prepared using a quasi-prepolymer. Examples 3 and 4 are also outside the scope of the present invention as the foams were prepared using quasi-prepolymers which were prepared from polyether polyols. Examples 1–4 are presented for purposes of comparison with the foams of the present invention.

TABLE IV

| Example Component | 9 | 10 | 11 | 12 | 13 | 14 | 15 | 16 |
|---|---|---|---|---|---|---|---|---|
| Sample H | 155.7 | 154.7 | 151.4 | 151.6 | 149.1 | 138.8* | 148.9 | 150.0 |
| LUPRANATE ® M20S | 114.3 | | | | | | | |
| LUPRANATE ® M70 | | 115.3 | | | | | | |
| Sample J | | | 118.6 | | | | | |
| Sample E | | | | 118.4 | | | | |
| Sample A | | | | | 120.9 | | | |
| Sample F | | | | | | 131.2 | | |
| Sample C | | | | | | | 121.1 | |
| Sample D | | | | | | | | 120.0 |
| Index | 95 | 95 | 95 | 95 | 95 | 95 | 95 | 95 |

*5.4 parts by weight Fluorocarbon 11A added to the resin to adjust density.

As can be seen above in Table IV, Examples 9 and 10 are outside the scope of the present invention as the foams were not prepared using a quasi-prepolymer. Examples 11 and 12 are also outside the scope of the present invention as the foams were prepared using quasi-prepolymers which were prepared from polyether polyols Examples 9–12 are presented for purposes of comparison with the foams of the present invention.

TABLE V

| Example Component | 17 | 18 | 19 | 20 | 21 | 22 | 23 | 24 |
|---|---|---|---|---|---|---|---|---|
| Sample I | 128.2 | 127.1 | 123.8 | 124.0 | 121.5 | 111.4** | 121.3 | 122.4 |
| LUPRANATE ® M20S | 141.8 | | | | | | | |
| LUPRANATE ® M70 | | 142.9 | | | | | | |
| Sample J | | | 146.2 | | | | | |
| Sample E | | | | 146.0 | | | | |
| Sample A | | | | | 148.5 | | | |
| Sample F | | | | | | 158.6 | | |
| Sample C | | | | | | | 148.7 | |
| Sample D | | | | | | | | 147.6 |
| Index | 250 | 250 | 250 | 250 | 250 | 250 | 250 | 250 |

**5.4 parts by weight Fluorocarbon 11A added to the resin to adjust density. Total resin was 118.8 pbw.

As can be seen above in Table V, Examples 17 and 18 are outside the scope of the present invention as the foams were not prepared using a quasi-prepolymer Examples 19 and 20 are also outside the scope of the present invention as the foams were prepared using quasi-prepolymers which were prepared from polyether polyols. Examples 17–20 are presented for purposes of comparison with the foams of the present invention.

TABLE VI

| Example | 25 | 26 | 27 | 28 | 29 | 30 |
|---|---|---|---|---|---|---|
| Component | | | | | | |
| Sample H | 145.2 | 145.2 | 145.2 | 139.0 | 139.0 | |
| Sample H$_{mod}$ | | | | | | 150.5 |
| LUPRANATE ® M20S | 124.8 | | | | | |
| LUPRANATE ® M70 | | 124.8 | | | | |
| No. 78 Isocyanate | | | 124.8 | | | 124.7 |
| Sample A | | | | 131.0 | | |
| Sample K | | | | | 131.0 | |
| Index | 110 | 110 | 110 | 110 | 110 | 108 |

As can be seen above in Table VI, Examples 25, 26 and 27 are outside the scope of the present invention as the foams were not prepared using a quasi-prepolymer Examples 25–27 are presented for purposes of comparison with the foams of the present invention.

Thermal conductivity (K-Factor) was measured using ASTM C-518-177-45, "Steady-State Thermal Transmission Properties by Means of the Heat Flow Meter." In addition to the initial readings, K-Factors were measured after aging for certain periods of time. Samples were aged in an oven which was regulated to 140° F. ±5° and 10% ±5% relative humidity. Samples were removed from the oven and measured after aging 11 days, 30 days, 73 or 75 days, and 100 days. After removal from the oven, samples were allowed to sit for at least one-half hour prior to testing. After the tests were completed, samples were returned to the oven where they continued the aging process.

TABLE VII

Thermal Conductivity Measurements For Table III Foams

| Example No. | Initial | 11 Days | 30 Days | 73 Days | 100 Days |
|---|---|---|---|---|---|
| 1A | 0.124 | 0.134 | 0.142 | 0.161 | 0.165 |
| 1B | 0.123 | 0.133 | 0.144 | 0.161 | 0.165 |
| 2A | 0.121 | 0.131 | 0.137 | 0.159 | 0.163 |
| 2B | 0.119 | 0.132 | 0.142 | 0.158 | 0.164 |
| 3A | 0.123 | 0.135 | 0.147 | 0.164 | 0.167 |
| 3B | 0.123 | 0.138 | 0.147 | 0.164 | 0.166 |
| 4A | 0.119 | 0.135 | 0.142 | 0.160 | 0.164 |
| 4B | 0.122 | 0.134 | 0.141 | 0.161 | 0.164 |
| 5A | 0.116 | 0.127 | 0.136 | 0.151 | 0.154 |
| 5B | 0.115 | 0.125 | 0.130 | 0.151 | 0.153 |
| 6A | 0.113 | 0.123 | 0.129 | 0.146 | 0.150 |
| 6B | 0.113 | 0.118 | 0.125 | 0.142 | 0.151 |
| 7A | 0.114 | 0.127 | 0.135 | 0.153 | 0.156 |
| 7B | 0.117 | 0.123 | 0.130 | 0.153 | 0.157 |
| 8A | 0.118 | 0.131 | 0.140 | 0.159 | 0.162 |
| 8B | 0.121 | 0.132 | 0.141 | 0.158 | 0.163 |

The data shown in Table VII generally demonstrates foams of the present invention, Examples 5–8 have lower thermal conductivity measurements than foams prepared not using a quasi-prepolymer, Examples 1 and 2, and foams prepared using a polyether quasi-prepolymer, Examples 3 and 4.

TABLE VIII

Thermal Conductivity Measurements for Table IV Foams

| Example No. | Initial | 11 Days | 30 Days | 73 Days | 100 Days |
|---|---|---|---|---|---|
| 9A | 0.114 | 0.122 | 0.142 | 0.147 | 0.156 |
| 9B | 0.116 | 0.122 | 0.140 | 0.146 | 0.153 |
| 10A | 0.116 | 0.125 | 0.143 | 0.147 | 0.158 |
| 10B | 0.113 | 0.123 | 0.141 | 0.146 | 0.156 |
| 11A | 0.112 | 0.122 | 0.143 | 0.142 | 0.153 |
| 11B | 0.115 | 0.122 | 0.139 | 0.145 | 0.153 |
| 12A | 0.114 | 0.121 | 0.140 | 0.145 | 0.153 |
| 12B | 0.111 | 0.121 | 0.141 | 0.146 | 0.154 |
| 13A | 0.112 | 0.122 | 0.139 | 0.142 | 0.150 |
| 13B | 0.111 | 0.118 | 0.137 | 0.144 | 0.151 |
| 14A | 0.109 | 0.121 | 0.139 | 0.143 | 0.151 |
| 14B | 0.111 | 0.118 | 0.137 | 0.144 | 0.148 |
| 15A | 0.111 | 0.122 | 0.140 | 0.145 | 0.151 |
| 15B | 0.110 | 0.117 | 0.134 | 0.142 | 0.149 |
| 16A | 0.110 | 0.121 | 0.139 | 0.144 | 0.155 |
| 16B | 0.113 | 0.123 | 0.141 | 0.146 | 0.151 |

The data shown in Table VIII generally demonstrates foams of the present invention, Examples 13–16 have lower thermal conductivity measurements than foams prepared not using a quasi-prepolymer, Examples 9 and 10, and foams prepared using a polyether quasi-prepolymer, Examples 11 and 12.

TABLE IX

Thermal Conductivity Measurements For Table V Foams

| Example No. | Initial | 11 Days | 30 Days | 73 Days | 100 Days |
|---|---|---|---|---|---|
| 17A | 0.114 | 0.126 | 0.145 | 0.160 | 0.159 |
| 17B | 0.115 | 0.130 | 0.145 | 0.157 | 0.161 |
| 18A | 0.114 | 0.128 | 0.146 | 0.159 | 0.157 |
| 18B | 0.112 | 0.127 | 0.144 | 0.156 | 0.158 |
| 19A | 0.116 | 0.132 | 0.147 | 0.161 | 0.163 |
| 19B | 0.116 | 0.132 | 0.149 | 0.161 | 0.164 |
| 20A | 0.114 | 0.127 | 0.144 | 0.158 | 0.160 |
| 20B | 0.113 | 0.127 | 0.142 | 0.157 | 0.162 |
| 21A | 0.108 | 0.118 | 0.132 | 0.146 | 0.149 |
| 21B | 0.108 | 0.120 | 0.131 | 0.146 | 0.148 |
| 22A | 0.106 | 0.116 | 0.130 | 0.145 | 0.149 |
| 22B | 0.106 | 0.118 | 0.127 | 0.146 | 0.147 |
| 23A | 0.108 | 0.121 | 0.137 | 0.147 | 0.150 |
| 23B | 0.108 | 0.120 | 0.130 | 0.144 | 0.146 |
| 24A | 0.111 | 0.126 | 0.141 | 0.151 | 0.159 |
| 24B | 0.113 | 0.126 | 0.137 | 0.151 | 0.157 |

The data shown in Table IX generally demonstrates foams of the present invention, Examples 21–24 have lower thermal conductivity measurements than foams prepared not using a quasi-prepolymer, Examples 17 and 18, and foams prepared using a polyether quasi-prepolymer, Examples 19 and 20.

TABLE X

Thermal Conductivity Measurements for Table VI Foams

| Example No. | Initial | 10 Days | 30 Days |
|---|---|---|---|
| 25A | .123 | | |
| 25B | .122 | | |
| 26A | .120 | | |
| 26B | .121 | | |
| 27A | .125 | | |
| 27B | .126 | | |
| 28A | .115 | | |
| 28B | .115 | | |
| 29A | .121 | | |
| 29B | .118 | | |
| 30* | .119 | .137 | .153 |

*single sample evaluated.

The data shown in Table X generally demonstrates foams of the present invention, Examples 28, 29, and 30 have lower initial thermal conductivity measurements than foams prepared not using a quasi-prepolymer, Examples 25, 26 and 27.

The embodiments of the invention in which an exclusive property or privilege is claimed are defined as follows:

1. A polyurethane foam prepared by reacting
   (a) an isocyanate terminated quasi-prepolymer consisting of the reaction product of an organic polyisocyanate with a polyester polyol consisting of the reaction product of phthalic anhydride and a low molecular weight aliphatic polyhydric alcohol; with
   (b) a polyol selected from the group consisting of polyether polyols, hydroxyl-functional polyester polyols, and hydroxyl-functional polyesterether polyols;
in the presence of a urethane group promoting catalyst, a blowing agent, and suitable additives and auxiliaries.

2. The polyurethane foam according to claim 1 wherein said polyol (b) is a polyester polyol.

3. The polyurethane foam according to claim 1 wherein said polyol (b) is a polyester polyol.

4. The polyurethane foam according to claim 1 wherein said organic polyisocyanate is polymeric MDI.

5. The polyurethane foam according to claim 1, wherein said blowing agent is water, a halocarbon, or a mixture thereof.

* * * * *

UNITED STATES PATENT AND TRADEMARK OFFICE
CERTIFICATE OF CORRECTION

PATENT NO. : 4,888,365

DATED : December 19, 1989

INVENTOR(S) : ROBERT E. RILEY AND THIRUMURTI NARAVAN

It is certified that error appears in the above-identified patent and that said Letters Patent is hereby corrected as shown below:

```
Column 14, line 62 should read as follows:
wherein said polyol (b) is a polyether polyol.
```

Signed and Sealed this

Twenty-third Day of October, 1990

Attest:

HARRY F. MANBECK, JR.

*Attesting Officer*  *Commissioner of Patents and Trademarks*